United States Patent [19]
Mowdood et al.

[11] Patent Number: 6,014,998
[45] Date of Patent: Jan. 18, 2000

[54] SILICA-REINFORCED TIRE COMPOSITIONS CONTAINING TRIAZOLES

[75] Inventors: Syed K. Mowdood, Hudson, Ohio; Ping Zhang, Chelmsford, Mass.; Cristiano Betté, Milan, Italy

[73] Assignee: Pirelli Pneumatici S.p.A., Milan, Italy

[21] Appl. No.: 09/093,594

[22] Filed: Jun. 9, 1998

[51] Int. Cl.[7] .............................. C08K 3/34; B60C 11/00; B60C 1/00
[52] U.S. Cl. ..................... 152/564; 152/209 R; 524/493; 524/495; 252/502
[58] Field of Search .............................. 152/565, 209 R; 524/493, 495; 252/502

[56] References Cited

U.S. PATENT DOCUMENTS

| | | | |
|---|---|---|---|
| 3,873,489 | 3/1975 | Thurn et al. | 260/33.6 |
| 4,017,654 | 4/1977 | Evans et al. | 156/96 |
| 4,169,112 | 9/1979 | Elmer et al. | 260/762 |
| 4,229,333 | 10/1980 | Wolff et al. | 260/23.7 M |
| 4,269,645 | 5/1981 | Shemenski, Sr. | 152/356 R |
| 4,269,877 | 5/1981 | Shemenski, Sr. | 152/356 R |
| 4,283,460 | 8/1981 | Shemenski, Sr. | 152/356 R |
| 4,519,430 | 5/1985 | Ahmad et al. | 152/209 R |
| 4,957,970 | 9/1990 | Holsapple et al. | 523/351 |
| 5,162,409 | 11/1992 | Mroczkowski | 523/262 |
| 5,219,944 | 6/1993 | Scriver et al. | 525/233 |
| 5,227,425 | 7/1993 | Rauline | 524/493 |
| 5,245,195 | 9/1993 | Shah et al. | 250/515.1 |
| 5,362,794 | 11/1994 | Innui et al. | 524/495 |
| 5,569,688 | 10/1996 | Meguriya et al. | 524/862 |
| 5,591,797 | 1/1997 | Barthel et al. | 524/493 |

FOREIGN PATENT DOCUMENTS

| | | |
|---|---|---|
| 1162674 | 2/1984 | Canada . |
| 0061986 | 6/1982 | European Pat. Off. . |
| 0157703 | 9/1985 | European Pat. Off. . |

OTHER PUBLICATIONS

Reinforcing Silicas and Silicates by M.P. Wagner, Technical Center, Chemical Division, PPG Industries, Inc., Barberton, Ohio 44203.

Compounding with Silica for Tear Strength and Low Heat Build–Up by N.L. Hewitt, PPG Industries, Pittsburgh, Pa., Rubber World Magazine, Jun. 1982.

High Performance Tire—Development of Tread Compounds by S. Futamura and M. L. Englehardt, Firestone Tire and Rubber Company, Akron, Ohio 44317. Presented at the Rubber Group Meeting, Akron, Ohio, Jan. 23, 1986.

Siegfried Wolff and Meng–Jiao Wang, Filler–Elastomer Interactions. Part IV. The Effect of the Surface Energies of Fillers on Elastomer Reinforcement, *Rubber Chem. & Tech.*, 65: 329–42 (1992).

Meng–Jiao Wang and Siegfried Wolff, Filler–Elastomer Interactions. Part I: Silica Surface Energies and Interactions with Model Compounds, *Rubber Chem. & Tech.*, 64: 559–576, (1990).

S. L. Cohen. V.A. Brusic, F.B. Kaufman, G.S. Frankel, S. Motadef, and B. Rush. JBM Research Division, T.J. Watson Research Center, Yorktown Heights, New York 10598. X–ray photoelectron spectroscopy and ellipsometry studies of the electrochemically controlled adsorption of benzotriazole on copper surfaces. (Received Oct. 23, 1989; accepted Dec. 18, 1989).

Siegfried Wolff and Meng–Jiao Wang, "Filler–Elastomer Interactions. Part IV. The Effect Of The Surface Energies Of Fillers On Elastomer Reinforcement", May, 1991, pp. 329–342 from *Rubber Chemistry and Technology*–vol. 65.

Meng–Jiao Wang, Siegfried Wolff and Jean–Baptiste Donnet, "Filler–Elastomer Interactions. Part I: Silica Surface Energies And Interactions With Model Compounds", May, 1990, pp. 559–576 from *Rubber Chemistry and Technology*–vol. 64.

Siegfried Wolff, Meng–Jiao Wang and Ewe–Hong Tan, "Filler–Elastomer Interactions. Part X. The Effect Of Filler–Elastomer And Filler–Filler Interaction On Rubber Reinforcement", May, 1993, pp. 1–23 and 11 pages of figures.

Degussa AG, Inorganic Chemical Products Division, Applied Technology, Fillers and Rubber Chemicals, Kalscheurener Str. 11, W–5030 Hürth, Federal Republic of Germany.

*Primary Examiner*—James J. Seidleck
*Assistant Examiner*—Olga Asinovsky
*Attorney, Agent, or Firm*—St. Onge Steward Johnston & Reens LLC

[57] ABSTRACT

Compositions of triazoles, such as benzotriazole or tolyltriazole, in silica reinforced rubber compositions for tire components and tires made of such compounds are provided exhibiting high cure rate, cure efficiency, hardness, static and dynamic moduli without deleteriously effecting hysteresis. Methods for optimizing silica reinforced tire properties utilizing triazoles, brass powder and carbon black are also provided. Typical tire compositions employ from about 2 to about 35 parts triazoles, and preferably from about 2 to about 6 parts triazoles, per hundred parts of rubber. In some compositions, brass powder and conductive carbon black are used in combination with the triazole in the rubber composition.

28 Claims, 1 Drawing Sheet

SILICA-REINFORCED TIRE COMPOSITIONS CONTAINING TRIAZOLES

FIELD OF THE INVENTION

This invention relates to the use of triazoles such as benzotriazole, tolyl triazole, and the like, in rubber compounds containing as a filler, silica or silica in blends with other particulate fillers, such as carbon black, clay and silicates. Even more particularly, this invention relates to tire compounds, such as those used in tread cushion, tread, sidewalls, bead, inner liner, carcass, and overlay components with the objective of improving their performance characteristics.

BACKGROUND OF THE INVENTION

Carbon black and silica have traditionally been used as fillers for reinforcing the physical and mechanical properties of elastomers, or rubbers selected from conjugated diene homopolymers and copolymers, copolymers of conjugated diene with vinyl monomers or terpolymers of diene with vinyl monomers, used to manufacture tires.

Silica has been used as a reinforcement material in tread compounds to reduce rolling resistance. See U.S. Pat. No. 5,227,425 to R. Rauline; U.S. Pat. No. 4,519,430 to S. Ahmad et al.; and, U.S. Pat. No. 3,873,489 to F. Thurn et al. However, conventionally compounded silica reinforced rubbers without coupling agents, such as 3,3'-bis(triethoxysilylpropyl)tetrasulfide, or 3-mercaptopropyltrimethoxysilane, have the disadvantage of exhibiting low modulus and reduced abrasion resistance, slow cure rates, and poor cure efficiency (i.e., extent of cross-linking achieved during curing or vulcanization) as compared to carbon black reinforced rubbers. See M. P. Wagner, *Rubber Chemistry & Technology*, vol. 49, pp. 703–773 (1976); and F. Thurn et al., U.S. Pat. No. 3,873, 489. Increases in tensile and dynamic storage moduli are known to improve road handling and performance of tires. See S. Futamura and M. Engelhardt, *Akron Rubber Group Meeting*, Akron, Ohio, U.S.A., Jan. 23, 1986. Silica interferes with the sulfur cure process and leads to low rubber-filler interaction which is responsible for low modulus and poor abrasion.

The use of coupling agents, such as polyfunctional organosilanes, including 3,3'-bis(triethoxysilylpropyl) tetrasulfide (hereinafter referred to as TESPT) or 3-mercaptopropyltrimethoxysilane (hereinafter referred to as A-189) have conventionally been used to enhance modulus, and abrasion resistance of silica-reinforced rubbers. While M. P. Wagner, *Rubber Chemistry & Technology*, vol. 49, pp. 703–773 (1976), N. L. Hewitt, *Rubber World*, pp. 24–30 (June 1982), F. Thurn et al., U.S. Pat. No. 3,873,489, and S. Wolff, U.S. Pat. No. 4,229,333 teach the use of coupling agents, such as TESPT and A-189 in a special formulation to improve the modulus of silica-reinforced rubbers, the resulting rubber compositions, nevertheless, exhibit slow cure rates, low hardness and moduli.

Benzotriazole and tolyltriazole have been used as a coating for brass-coated steel belts used in tires to reduce their corrosion and enhance adhesion between the steel belt and the (belt) skim compound. EP Pub. No. 61,986 to Shemenski, et al., CA Pat. No. 1,162,674 to Korpics, et al., and U.S. Pat. No. 4,169,112 to Elmer, disclose the addition of triazole (not exceeding 3 parts per hundred of rubber) and cobalt salts to a carbon black reinforced skim compound to improve its adhesion to the brass plated steel cord, and also reduce corrosion of the steel cord. None of the references teach the inventive rubber compounds, nor compounds suitable for tread, undertread, tread cushion, bead, or sidewall tire components containing silica, and triazoles. In addition, Korpics, and Elmer do not teach the enhanced road performance and handling of tires, as indicated by improvement in dynamic modulus (S. Futamura et al., *Akron Rubber Group Meeting,* Akron, Ohio, U.S.A., Jan. 23, 1986) made with silica, and silica and carbon black-reinforced rubber compositions having triazoles. Moreover, Shemenski, Korpics, and Elmer do not teach improving cure rates and moduli of rubber components with triazole with little to no effect on hysteresis. Further, none of the references disclose improved hardness, abrasion resistance, tensile strength and increased cure efficiency. None of the references, moreover, teach the use of triazoles in tire compounds, especially in tread where silica is a reinforcing filler.

What is desired, therefore, is a silica-reinforced rubber compound having improved cure rates and high moduli, and exhibiting little to no change in hysteresis (as indicated by tan δ at 70° C.), as compared to conventional silica and carbon black-reinforced rubber compounds. Also desired is a silica-reinforced rubber composition having high cure efficiency, improved hardness, abrasion resistance and durability. What is further desired is a tire with improved road performance and handling characteristics, as indicated by improvement in dynamic storage modulus (E') that is economical to produce as indicated by improved cure rate. What is even further desired is a method for improving road performance.

SUMMARY OF THE INVENTION

Accordingly, it is an object of the invention to provide tires having superior road performance and handling over conventional silica-reinforced tire compounds.

Another object of the invention is to provide tires exhibiting low rolling resistance (low hysteresis as indicated by tan δ at 70° C.), improved handling (as indicated by improved dynamic storage modulus and hardness), and resistance to wear.

A further object of the invention is to provide silica reinforced tires having superior physical and mechanical properties over conventional silica reinforced tire compounds.

Yet another object of the invention is to provide silica reinforced tire compounds having high tensile and dynamic storage moduli without exhibiting significant change in hysteresis over conventional silica reinforced tire compounds.

Still yet another object of the invention is to provide silica reinforced tire compounds having superior cure rates that use less thermal energy for curing (tires) over conventional silica reinforced tire compounds.

Even still another object of the invention is to provide silica reinforced tire compounds exhibiting high cure efficiencies.

Yet still a further object of the invention is to provide silica reinforced tire compounds having enhanced hardness and improved moduli.

These and other objectives are achieved by provision of methods for improving cure rates and cure efficiency, and enhancing the hardness and the tensile and dynamic storage moduli characteristics of silica reinforced rubber compounds, comprising the incorporation of at least one triazole into the composition. Preferably, triazoles are aromatic triazoles, more preferably benzotriazoles (BTA) or tolyltriazoles (TTA) or mixtures thereof, and can be selected from the group including BTA, TTA, methylbenzotriazole, napthyltriazole, hydrobenzotriazole, nitrobenzotriazole, 1H-1, 2,4-triazole-3-carboxylic acid, 1H-1,2,4-triazole 3-thiol, s-triazolo (4,3-a) quinoline, 4'(1H-1,2,4-triazol-1 yl)phenol, benzotriazole 5-carboxylic acid, 2-(2-benzotriazole)-p-cresol, N(3-triazolo)-maleimide, polyaminotriazole, polyoctamethylene aminotriazole, 1H-1, 2,4-triazole, 1H-1,2,3-triazole, and mixtures thereof. The amount of triazoles in the compositions typically vary from about 0.75 parts to about 35 parts, and preferably from about 2 to about 6 parts, per hundred parts of rubber. Some embodiments further comprise brass powder, conductive carbon black, and mixtures thereof.

In another aspect, the invention relates to tire compounds containing the above-referenced triazoles and fillers. In yet another aspect, the invention relates to methods for optimizing road handling and performance of tires by varying the amounts of triazoles, silica, silica/carbon black or other particulate fillers and coupling agents in rubber compounds used for tires.

The invention correspondingly provides silica reinforced rubber compounds containing triazoles, and further provides tires which have triazole-containing silica-reinforced rubber compounds in one or more components. Compositions and methods of improving rubber compounds according to the invention are useful for various tire components, including sidewall, bead, bead filler, inner liner, liner cushion, belt, carcass, overlay, tread cushion and treads.

The invention and its particular features will become more apparent from the following detailed description considered with reference to the accompanying figures.

DETAILED DESCRIPTION OF THE INVENTION

Figure 1:
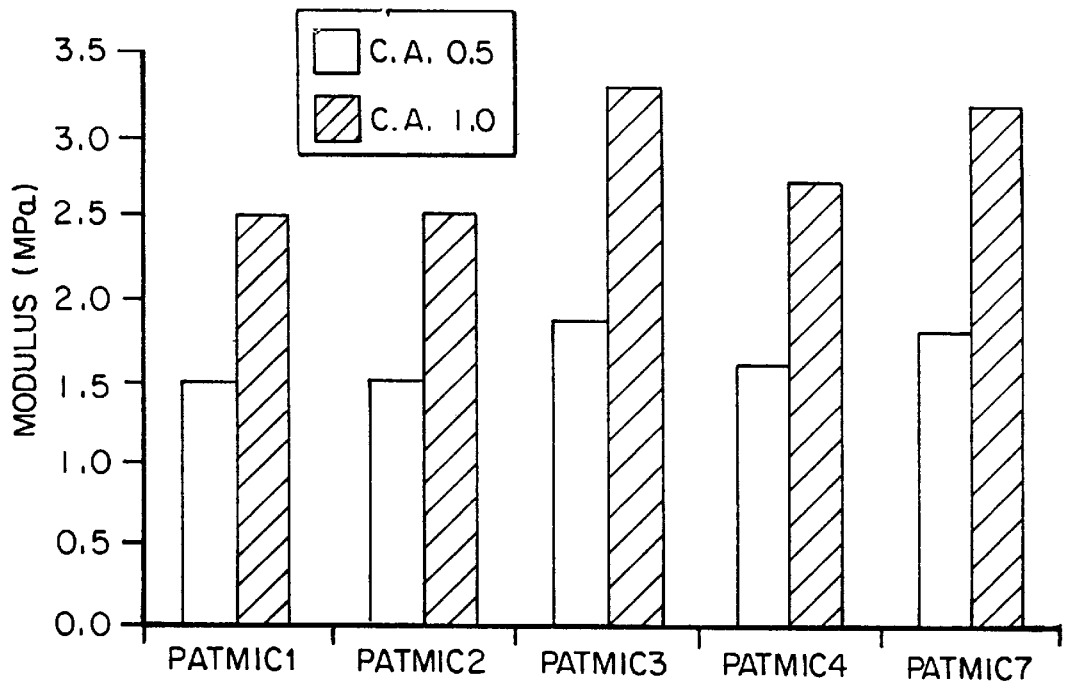
FIG. 1 is a bar graph showing an increase in tensile moduli for tire compounds of the invention (PATMIC3 and PATMIC7) compared to tire compositions without triazoles (PATMIC1, PATMIC2 and PATMIC4).

In the practice of the invention, a triazole or a triazole mixture is employed as an ingredient in silica reinforced rubber compositions that are useful in tire components. It is understood that "silica reinforced compounds" means rubbers compounded with precipitated silica, pyrogenic silica, or silicates as the predominate filler. Pyrogenic silica and silicates are less desirable.

Useful triazoles include BTA, methylbenzotriazole, TTA, naphthyltriazole, hydrobenzotriazole, nitrobenzotriazole, 1H-1,2,4-triazole-3-carboxylic acid, 1H-1,2,4-triazole 3-thiol, s-triazolo (4,3-a)quinoline, 4'(1H-1,2,4-triazol-1-yl) phenol, benzotriazole 5-carboxylic acid, 2-(2-benzotriazole)-p-cresol, N(3-triazolo)-maleimide, polyaminotriazole, polyoctamethylene aminotriazole, 1H-1, 2,4-triazole, 1H-$_{1,2,3}$-triazole, and the like, and mixtures thereof. Aromatic triazoles are preferred, and BTA, TTA or mixtures thereof are more preferable. It is understood that "triazoles" mean chemicals having a heterocyclic triazole ring and its various derivatives.

Silica reinforced tire compounds have from about 0.75 parts to about 35 parts of triazoles, preferably from about 2 to 6 parts triazoles per hundred parts of rubber. It is understood that "rubber" means any natural or synthetic rubber or various blends suitable for tires.

Triazoles and fillers of the invention are compounded with any natural and/or synthetic rubber or various blends of rubber. By the term "natural rubber" is meant rubber obtained from plant sources, such as Hevea braziliensis and Guayule, or its chemical equivalent, such as synthetic cis-1,4-polyisoprene (IR) and derivatives such as epoxidized or methacrylate grafted rubber. By the term "synthetic rubber" is meant any rubber produced synthetically, via emulsion, solution or bulk or gas phase process, such as polybutadiene, chlorobutadiene rubber, epichlorohydrin rubber, polyisoprene, styrene/butadiene copolymers (SBR), styrene/isoprene/butadiene (SIBR) terpolymers, butadiene/acrylonitrile copolymers, isoprene/acrylonitrile copolymers, ethylene/propylene/diene rubber (EPDM), butyl rubber and its halogenated derivatives, brominated para-methyl styrene isobutylene rubber, butadiene/styrene/acrylonitrile terpolymers, isoprene/styrene/acrylonitrile terpolymers, isoprene/butadiene copolymers, butadiene-alkyl acrylate or methacrylate copolymer, styrene/butadiene/alkylacrylate or alkylmethacrylate rubbers, modified SBR and BR and co- and terpolymers of diene with vinyl monomers containing silica or carbon black reactive functional groups and mixtures of the aforementioned rubbers with each other and/or with natural rubber. Blends of rubbers are preferred in some embodiments. Rubbers useful with the triazoles are also disclosed in U.S. Pat. No. 5,219,944 to Scriver et al, and U.S. Pat. No. 5,162,409 to Mroczkowski, and incorporated herein by reference.

Brass powder, conductive carbon black or mixtures thereof may also be added to the silica reinforced tire compounds containing triazoles to even further enhance the cure rate of the resulting tire compound. Triazoles such as BTA and TTA can also be used to improve the cure, tensile and dynamic moduli, and hardness properties of rubber compounds reinforced with other particulate fillers, such as clay, carbon black, mica, calcium carbonate, calcium silicate, calcium sulfate, alumina and mixtures thereof, with silica.

It was found that the addition of BTA in a silica reinforced tire compound containing TESPT as a coupling agent even further reduced the cure time, improved cure efficiency, increased tensile and dynamic storage moduli, without increasing hysteresis. Tables 1–5 show these results.

In some embodiments, carbon black, particularly conductive carbon black, and/or brass powder can be added to silica reinforced rubbers (Tables 1–5). Typical embodiments having a triazole, brass powder and conductive carbon black mixture are used in various combinations at a load level of about 2 to about 35 parts, per hundred parts of rubber. Preferred embodiments have a range of about 2 to about 20 parts triazole, brass powder and conductive carbon black mixture, per hundred parts of rubber. An embodiment containing 4 parts of BTA per hundred parts rubber is shown in Tables 1–5 and FIG. 1.

Materials of the invention are blended with conventional tire compound ingredients and additives, known to those skilled in the art, such as rubbers, processing aids, accelerators, cross-linking and curing materials, antioxidants, antiozonants, fillers, resins, etc. to make tire compounds. Processing aids include, but are not limited to, plasticizers, tackifiers, extenders, chemical conditioners, homogenizing agents, and peptizers such as mercaptans, synthetic oil, petroleum and vegetable oils, resins, rosins, and the like. Accelerators include amines, guanidines, thioureas, thiurams, sulfenamides, thiocarbamates, xanthates, benzothiazoles and the like. Cross-linking and curing agents include peroxides, sulfur, sulfur donors, accelerators, zinc oxide, and fatty acids. Fillers include reinforcing and/or conductive carbon black, brass powder, such as those described in Table 1, clay, bentonite, titanium dioxide, talc, calcium sulfate, silica, silicates and mixtures thereof.

Compositions of the invention are typically mixed by conventional means, in a single step or in multiple steps in an internal mixer, such as a Banbury, Intermesh mixer or extruder, or on a mill until a homogenized blend is obtained.

Figure 2:
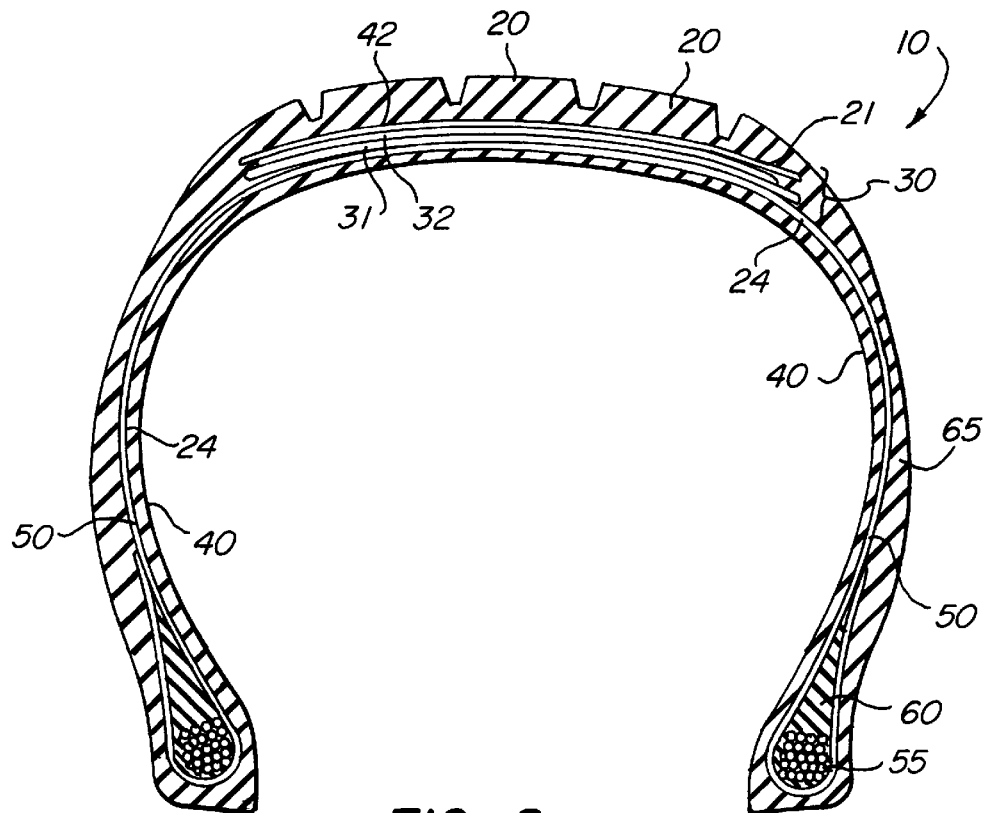
FIG. 2 is a schematic cross-section of a tire employing the compositions of the invention.

Rubber compounds of this invention can be used in tire treads (20) and/or sidewalls (65), bead fillers (60), components of the bead area, including the bead compound (55), tread cushion (21), liner cushion (24), belt (30), inner liner (40), overlay (42), and carcass (50) of a tire as shown in FIG. 2. Disposed crown-wise to the tire carcass (50), in the usual manner, is a tread component or band (20), and inserted between the carcass (50) and the tread band (20) is a belt structure (30) and above the belt (30) could be an overlay component above which lies a tread cushion (21) capped by the tread (20). The belt (30) comprises two radially superimposed layers, (31) and (32), of cords disposed at angles with respect to the midcircumferential plane of the tire in opposite directions, preferably symmetrically. Extending from tread portion (20) toward bead area (55) on the tire exterior is the sidewall (65), which may comprise the same rubber compound as the tread portion (20) or preferably a different rubber compound.

The following examples are presented to further illustrate and explain the present invention and should not be taken as limiting in any regard. Unless otherwise mentioned, all parts and percentages are by weight. All physical and mechanical measurements were conducted using industry standard test methods.

EXAMPLES

A silica reinforced tread compound containing a combination of cis polybutadiene (herein abbreviated BR) and a high vinyl solution styrene butadiene rubber (solution SBR) was used for the evaluation of the effect of BTA on the properties of the compound. The formulations used are listed in Table 1. The materials are mixed in two or more steps in a mixer. In the preferred embodiment, a three step mixing sequence is employed. The first step involved mixing of the rubbers with filler (silica), oil, fatty acid (stearic acid), BTA, antidegradants (6-PPD, wax), and zinc oxide, followed by another step where the coupling agent (TESPT, 50% mixture in N330 carbon black) was added. In the third or final step, curing ingredients, such as sulfur, diphenyl guanidine and N-cyclohexyl-2-benzothiazole sulfenamide, were added.

Tables 1–5 set forth formulations and test results for silica reinforced tire compounds containing BTA, brass powder, and conductive carbon black and mixtures thereof as compared to reference compound containing no BTA, brass powder or conductive carbon black.

TABLE 1

FORMULATIONS OF TREAD COMPOSITIONS

| Ingredient | PATMIC1 | PATMIC2 | PATMIC3 | PATMIC4 | PATMIC7 |
|---|---|---|---|---|---|
| cis-Polybutadiene | 25.0 | 25.0 | 25.0 | 25.0 | 25.0 |
| Solution SBR | 103.0 | 103.0 | 103.0 | 103.0 | 103.0 |
| Brass Powder 1106 | — | 4.0 | — | — | 4.0 |
| BTA | — | — | 4.0 | — | 4.0 |
| Conductive Carbon Black | — | — | — | 4.0 | 4.0 |
| Stearic Acid | 2.0 | 2.0 | 2.0 | 2.0 | 2.0 |
| Zinc Oxide | 2.5 | 2.5 | 2.5 | 2.5 | 2.5 |
| Wax | 1.5 | 1.5 | 1.5 | 1.5 | 1.5 |
| Silica (VN3) | 80.0 | 80.0 | 80.0 | 80.0 | 80.0 |
| Aromatic Oil | 4.37 | 4.37 | 4.37 | 4.37 | 4.36 |
| 6-PPD | 2.0 | 2.0 | 2.0 | 2.0 | 2.0 |
| TEST (50%) | 12.8 | 12.8 | 12.8 | 12.8 | 12.8 |
| DPG | 2.0 | 2.0 | 2.0 | 2.0 | 2.0 |
| CBS | 1.7 | 1.7 | 1.7 | 1.7 | 1.7 |
| Sulfur | 1.4 | 1.4 | 1.4 | 1.4 | 1.4 |

Note: Solution SBR is styrene butadiene rubber with 20% styrene, 60% vinyl containing 37.5 parts aromatic oil; brass powder 1106 is 70% Cu and 30% Zn from Zinc Corp. of America; BTA is benzotriazole; VN3 is a precipitated silica from Degussa Corp.; conductive carbon black, is Ensaco 23MM; wax is a microcrystalline wax; 6-PPD is N-1,3-dimetylbutyi-N'-phenyl-p-phenylene diamine; TESPT is a 50% dispersion of 3,3'-bis (triethoxysiylpropyl) tetrasulfide in N330 carbon black; DPG is diphenylguanidine; CBS is N-cyclohexyl 2-benzothiazole sulfenamide; all amounts are in parts by weight per hundred parts of the rubbers described.

Table 2 shows a comparison of cure and processing characteristics of the formulations of Table 1.

TABLE 2

CURE AND PROCESSING CHARACTERISTICS OF TREAD COMPOSITIONS CURED FOR 10 MINUTES AT 170° C.

| | PATMIC1 | PATMIC2 | PATMIC3 | PATMIC4 | PATMIC7 |
|---|---|---|---|---|---|
| Viscosity at 100° C., Mooney (ML(1 + 4)) (ISO 289-1) | 88.6 | 82.5 | 95.0 | 91.4 | 89.8 |
| MDR 170° C. (ISO 6502): | | | | | |
| TS02 (Min) | 1.02 | 1.09 | 0.47 | 1.04 | 0.49 |
| T05 (Min) | 0.64 | 0.70 | 0.34 | 0.66 | 0.37 |
| T90 (Min) | 13.74 | 12.51 | 11.25 | 12.60 | 7.76 |
| Rheometer (D2084) ML (s · dNM) | 4.27 | 3.83 | 4.64 | 4.45 | 4.30 |
| Rheometer (D2084) ΔM (s · dNM) | 20.48 | 19.67 | 22.65 | 19.98 | 22.65 |
| Cure Rate 100/s | 7.87 | 8.76 | 9.28 | 8.65 | 13.76 |

Table 3 shows the hardness and densities of compounds containing no benzotriazole (reference) and those containing brass powder, conductive carbon black and benzotriazole.

TABLE 3

PHYSICAL PROPERTIES COMPARISON CURED FOR 10 MINUTES AT 170° C.

| | PATMIC1 | PATMIC2 | PATMIC3 | PATMIC4 | PATMIC7 |
|---|---|---|---|---|---|
| Hardness (IRHP, ISO 48): | | | | | |
| At 0° C. | 78.2 | 76.2 | 84.0 | 79.0 | 82.2 |
| At 23° C. | 74.1 | 73.1 | 79.9 | 74.9 | 76.8 |
| At 100° C. | 68.5 | 68.0 | 73.0 | 69.6 | 70.7 |
| Density (g/cm$^3$) | 1.205 | 1.213 | 1.205 | 1.204 | 1.217 |

Table 4 shows the mechanical properties of the triazole-containing compositions relative to the reference. By comparing the static modulus at 50, 100 and 300% strain, it can be seen that adding a triazole compound to a silica reinforced rubber composition significantly increases the static modulus of the silica reinforced rubber compound. FIG. 1 shows these increases in static moduli over the reference compounds. Addition of brass powder has no effect, whereas conductive carbon black yields little improvement, followed by good improvement when all three ingredients, e.g. BTA, conductive carbon black and brass powder, are used. It should be pointed out that BTA alone shows the best increase in static moduli.

TABLE 4

MECHANICAL PROPERTIES COMPARISON CURED FOR 10 MINUTES AT 170° C.

| | PATMIC1 | PATMIC2 | PATMIC3 | PATMIC4 | PATMIC7 |
|---|---|---|---|---|---|
| Static Modulus (ISO 37): | | | | | |
| 50% Modulus (Mpa) | 1.49 | 1.48 | 1.84 | 1.57 | 1.77 |
| 100% Modulus (Mpa) | 2.47 | 2.49 | 3.24 | 2.67 | 3.14 |
| 300% Modulus (Mpa) | 10.4 | 10.23 | 12.31 | 10.98 | 11.82 |
| Tensile (Mpa) | 17.12 | 17.11 | 17.60 | 17.77 | 16.55 |
| Elongation (%) | 478.4 | 472.8 | 433.4 | 466.8 | 427.1 |
| Energy (J/cm$^3$) | 32.61 | 32.28 | 31.96 | 33.13 | 29.64 |
| DIN Abrasion (mm$^3$) (ISO 4649) | 94.3 | 95.0 | 96.8 | 92.2 | 96.1 |

Table 5 shows a comparison of the dynamic properties of the compositions measured at 10 Hz and 100 Hz. It can be seen that the dynamic storage (E') and loss moduli (E") at 70° 0 C. are higher for compositions with triazoles, while the tan δ is not significantly effected. Thus, tire performance and handling can be improved by adding triazoles.

TABLE 5

DYNAMIC PROPERTIES OF COMPOUNDS AT 100 HZ, PRESTRAIN AT 25%, DEFORMATION AT 3.5% CURED FOR 10 MINUTES AT 170° C.

| | PATMIC1 | PATMIC2 | PATMIC3 | PATMIC4 | PATMIC7 |
|---|---|---|---|---|---|
| E' (Mpa) at 0° C. | 16.42 | 15.674 | 20.524 | 17.150 | 19.828 |
| E' (Mpa) at 23° C. | 10.300 | 9.844 | 12.664 | 10.780 | 12.148 |
| E' (Mpa) at 70° C. | 7.469 | 7.346 | 8.388 | 7.722 | 8.260 |
| E" (Mpa) at 0° C. | 7.879 | 7.457 | 9.501 | 8.367 | 9.195 |
| E" (Mpa) at 23° C. | 2.680 | 2.520 | 3.413 | 2.890 | 3.401 |
| E" (Mpa) at 70° C. | 1.079 | 1.031 | 1.264 | 1.166 | 1.288 |
| Tan δ at 0° C. | 0.480 | 0.476 | 0.463 | 0.488 | 0.464 |
| Tan δ at 23° C. | 0.260 | 0.256 | 0.270 | 0.268 | 0.280 |
| Tan δ at 70° C. | 0.145 | 0.140 | 0.151 | 0.151 | 0.156 |
| DYNAMIC PROPERTIES at 10 Hz | | | | | |
| E' (Mpa) at 0° C. | 11.745 | 11.232 | 15.214 | 12.481 | 14.091 |
| E' (Mpa) at 23° C. | 8.629 | 8.301 | 10.488 | 9.024 | 10.060 |
| E' (Mpa) at 70° C. | 6.687 | 6.523 | 7.677 | 6.985 | 7.488 |
| E" (Mpa) at 0° C. | 3.580 | 3.191 | 4.465 | 3.707 | 4.476 |
| E" (Mpa) at 23° C. | 1.572 | 1.475 | 1.964 | 1.721 | 2.021 |
| E" (Mpa) at 70° C. | 0.803 | 0.759 | 0.880 | 0.859 | 0.933 |
| Tan δ at 0° C. | 0.305 | 0.284 | 0.293 | 0.297 | 0.318 |
| Tan δ at 23° C. | 0.183 | 0.178 | 0.187 | 0.191 | 0.201 |
| Tan δ at 70° C. | 0.120 | 0.116 | 0.115 | 0.123 | 0.125 |

The processing characteristics of the compounds are listed in Table 2. It can be seen from the data presented, that the introduction of BTA into the formulation results in modification of the curing characteristics of the compound as indicated by the reduction in TS02, T05 and T90. It should be noted that the compositions of the invention result in a significant decrease in time for 90% cure (T90) as shown in Table 2. The Mooney viscosity of the compound with 4.0 parts BTA per hundred parts rubber (PATMIC3) (Tables 1, 2) increases in comparison to that of the reference compounds. The introduction of BTA surprisingly accelerates the cure, as shown by the cure data in Tables 2.

The physical and dynamic properties of compounds are listed in Tables 3–5. It can be seen that the introduction of BTA gives rise to an increase in the hardness (Table 3) of the compounds at all three temperatures—0, 23 and 100° C., especially in the case of compound PATMIC3. Similar results are seen in the case of tensile modulus as shown in FIG. 1, where the introduction of 4 parts of BTA per hundred parts of the rubber composition results in an increase in the 50% and 100% moduli of the compound (Table 4). Similar enhancement was observed in the dynamic storage (E') and loss (E") moduli (Table 5) without significantly affecting the tan δ values as shown in Table 5.

The DIN abrasion characteristics of compounds are shown in Table 4. These results show that the addition of BTA had no adverse effect on abrasion resistance which is indicative of road wear and tire life.

The data in Tables 4–5 show that the introduction of BTA in an all-silica compound results in quite significant enhancement of the mechanical and dynamic properties of the tire compounds. The presence of BTA in the compound also gives rise to faster cure as indicated from the MDR data. While not wishing to be bound to any theory, it is believed that the triazole disclosed herein may modify the surface of the silica through the interaction, such as hydrogen bonding, of the triazole functional group with the silanol functional group. The presence of the triazole functional group in TTA as well as BTA, and other triazoles disclosed herein can be expected to similarly improve compound cure rate, moduli and hardness without adversely effecting hysteresis.

Although the invention has been described with reference to particular ingredients and formulations and the like, these are not intended to exhaust all possible arrangements or features, and indeed many other modifications and variations will be ascertainable to those of skill in the art.

We claim:

1. A method for forming a silica-reinforced rubber composition having improved cure and static and dynamic moduli comprising the steps of:
    mixing at least one triazole with silica, a coupling agent and rubber to form a silica reinforced rubber composition.

2. A method according to claim 1 wherein the triazole is an aromatic triazole.

3. A method according to claim 1 wherein the triazole is selected from the group consisting of benzotriazole, tolyltriazole, napthyltriazole, methylbenzotriazole, hydrobenzotriazole, nitrobenzotriazole, 1H-1,2,4-triazole 3-thiol, 1H-1,2,4-triazole-3-carboxylic acid, s-triazolo (4,3-a)quinoline, 4'(1H-1,2,4-triazol-1 yl)phenol, benzotriazole 5-carboxylic acid, 2-(2-benzotriazole)-p-cresol, N(3-triazolo)-maleimide, polyaminotriazole, polyoctamethylene aminotriazole, 1H-1,2,4-triazole, and 1H-1,2,3-triazole.

4. A method according to claim 3 wherein the triazole is selected from the group consisting of benzotriazole, tolyltriazole, or mixtures thereof.

5. A method according to claim 4 wherein the triazole is benzotriazole or tolyl triazole.

6. A method according to claim 1 wherein the triazole comprises from about 0.75 to about 35 parts per hundred parts of rubber.

7. A method according to claim 6 wherein the triazole comprises from about 2 to about 6 parts per hundred parts of rubber.

8. A silica-reinforced rubber composition containing silica, a coupling agent, and about 0.75 to about 35 parts of triazole per hundred parts of rubber.

9. A composition according to claim 8 where the rubber is selected from the group consisting of natural rubber, epoxidized natural rubber, methacrylated natural rubber, synthetic polyisoprene, polybutadiene, styrene-butadiene copolymer, styrene/isoprene/butadiene terpolymer, ethylene/propylene/diene terpolymer (EPDM), epichlorohydrin rubber, chlorobutadiene rubber, halobutyl rubber, brominated para-methyl styrene isobutylene rubber, butadiene/styrene/acrylonitrile terpolymer, isoprene/styrene/acrylonitrile terpolymer, isoprene/butadiene copolymer, alkyl acrylate or methacrylate butadiene or isoprene copolymer, acrylonitrile/butadiene copolymer, acrylonitrile-isoprene copolymer, vinyl pyridine-butadiene copolymer and/or mixtures thereof.

10. A composition according to claim 8 wherein the triazole is an aromatic triazole.

11. A composition according to claim 8 comprising from about 2 to about 6 parts triazole per hundred parts of rubber.

12. A composition according to claim 8 wherein the triazole is selected from the group consisting of benzotriazole, tolyltriazole, napthyltriazole, methylbenzotriazole, hydrobenzotriazole, nitrobenzotriazole, 1H-1,2,4-triazole 3-thiol, 1H-1,2,4-triazole-3-carboxylic acid, s-triazolo (4,3-a) quinoline, 4'(1H-1,2,4-triazol-1 yl)phenol, benzotriazole 5-carboxylic acid, 2-(2-benzotriazole)-p-cresol, N(3-triazolo)maleimide, polyaminotriazole, polyoctamethylene aminotriazole, 1H-1,2,4-triazole, and 1-H-1,2,3-triazole.

13. A composition according to claim 8 wherein the composition further comprises a material selected from the group consisting of brass powder, conductive carbon black, or mixtures thereof.

14. A composition according to claim 12 wherein the triazole is selected from the group consisting of benzotriazole, tolyltriazole, or mixtures thereof.

15. A composition according to claim 12 wherein the mixture of triazole, brass powder and conductive carbon black are present In a range of from about 2 to about 35 parts per hundred parts of rubber.

16. A tire comprising the composition of claim 8.

17. A tire comprising the composition of claim 15, wherein the composition is in a tire component selected from the group consisting of a sidewall, bead, bead filler, inner liner, liner cushion, carcass, overlay, tread cushion and tread.

18. A tire comprising the composition of claim 15, wherein the rubber comprises poly-butadiene and styrene-butadiene copolymer.

19. A tire according to claim 17 wherein the filler is a material selected from the group consisting of conductive carbon black, brass powder, benzotriazoles, and mixtures thereof.

20. A tire according to claim 16 wherein the rubber further comprises polyisoprene and styrene-butadiene having 20% of styrene content.

21. A tire comprising the composition of claim 15, wherein the triazole is an aromatic triazole.

22. A tire comprising a silica-reinforced rubber composition containing a coupling agent and from about 0.75 to about 35 parts, per hundred parts of rubber, of a triazole selected from the group consisting of benzotriazole, tolyltriazole, and mixtures thereof.

23. A tire according to claim 22 wherein the composition contains from about 2 to about 6 parts of triazole per hundred parts of rubber.

24. A tire according to claim 22 wherein the composition further comprises a material selected from the group consisting of brass powder, conductive carbon black, or mixtures thereof.

25. A tire according to claim 22 wherein the composition is in a tire component selected from the group consisting of a sidewall, bead, bead filler, inner liner, liner cushion, carcass, overlay, tread cushion and tread.

26. A tire according to claim 22 wherein the triazole is benzotriazole.

27. A silica-reinforced rubber composition according to claim 8 wherein the coupling agent is a polyfunctional organosilane.

28. A composition according to claim 8, wherein the coupling agent is selected from the group consisting of 3,3'-bis(triethoxysilylpropyl)tetrasulfide and 3-mercaptopropyltrimethoxysilane.

* * * * *